United States Patent [19]

Baker et al.

[11] 4,193,307
[45] Mar. 18, 1980

[54] APPARATUS FOR INDICATING SUBSEA WELL HEAD PRESSURE

[75] Inventors: Gerald S. Baker; Guerry L. Hahn, both of Houston, Tex.

[73] Assignee: Cameron Iron Works, Inc., Houston, Tex.

[21] Appl. No.: 915,538

[22] Filed: Jun. 14, 1978

[51] Int. Cl.$^2$ ............................................. G01L 7/16
[52] U.S. Cl. ........................................ 73/701; 73/744
[58] Field of Search ................. 73/701, 744, 152, 155

[56] References Cited

U.S. PATENT DOCUMENTS

| | | | |
|---|---|---|---|
| 2,451,451 | 10/1948 | Tate | 73/701 |
| 2,792,709 | 5/1957 | Bell et al. | 73/155 |
| 3,084,548 | 4/1963 | Copland et al. | 73/744 |
| 3,729,997 | 5/1973 | Luke | 73/302 |

*Primary Examiner*—Donald O. Woodiel
*Attorney, Agent, or Firm*—Vinson & Elkins

[57] ABSTRACT

An apparatus for indicating at the surface, the subsea well head pressure including; a reservoir, a subsea hydraulic transmitter, a pump to pump hydraulic fluid from reservoir to the subsea hydraulic transmitter, a pressure gauge connected at the surface in the line from the pump to the transmitter, means connecting the transmitter to said reservoir, means for connecting the transmitter to the well head whereby well head pressure is delivered to the transmitter, the transmitter being located on the subsea well head equipment, a flow controlling restrictor connected between the pump and the pressure gauge and the transmitter, the transmitter having a body with a bore at one end and a counterbore at the other end, a piston slidable in said bore and connected to a diaphragm in the counterbore, the piston being exposed to well head pressure, the diaphragm being exposed to pump pressure on one side and to hydrostatic head on the other side with opposite sides of the diaphragm having equal areas to compensate for hydrostatic head, an exhaust valve actuated by the diaphragm to close communication between opposite sides thereof whenever forces from the pump pressure on diaphragm is exceeded by the force on the piston so that the pressure gauge provides a surface indication of well head pressure.

11 Claims, 3 Drawing Figures

APPARATUS FOR INDICATING SUBSEA WELL HEAD PRESSURE

BACKGROUND

Subsea well head pressures have been measured and surface indication provided at the surface electrically and pneumatically but difficulty has been encountered in utilizing hydraulics therefor.

The use of an electric signal to the surface to provide an indication of pressure is disclosed in the Bruce et al. U.S. Pat. No. 3,815,673. A pneumatic system for determining static pressure in a well bore is suggested by the Bell et al. U.S. Pat. No. 2,792,709. The Luke U.S. Pat. No. 3,729,997 uses a gas bubbling device to determine liquid level and includes a sensor with two diaphragm chambers, the diaphragms being interconnected by a lever type of mechanism to provide a comparison of pressures and to introduce bubbles to neutralize the diaphragm forces. There is no attempt to compensate for hydraulic head. Also, fluid relays having multiple diaphragm compartments have been used to compare or otherwise interrelate at least two fluid pressures in a control system. An example of such fluid relays is offered by Moore Products Co. of Spring House, Pennsylvania as multifunction computing relays.

SUMMARY

The present invention provides an improved apparatus for obtaining an indication of a subsea well head pressure at the surface. This apparatus includes a means of supplying hydraulic fluid under pressure and under the control of a flow controller. This hydraulic fluid is pumped to a transmitter at the subsea well head which compares the hydraulic fluid pressure with the well head pressure. A pressure gauge at the surface in the flow line supplying the hydraulic fluid under pressure provides an indication of well head pressure since any time the pumped hydraulic pressure exceeds the aforementioned sums it is exhausted to a return line.

The present invention utilizes hydraulics to provide a surface indication of a subsea well head pressure.

BRIEF DESCRIPTION OF THE DRAWINGS

The advantages of the improved structure of the present invention are hereinafter set forth and explained with reference to the drawings wherein.

DESCRIPTION OF THE PREFERRED EMBODIMENTS

Figure 1:
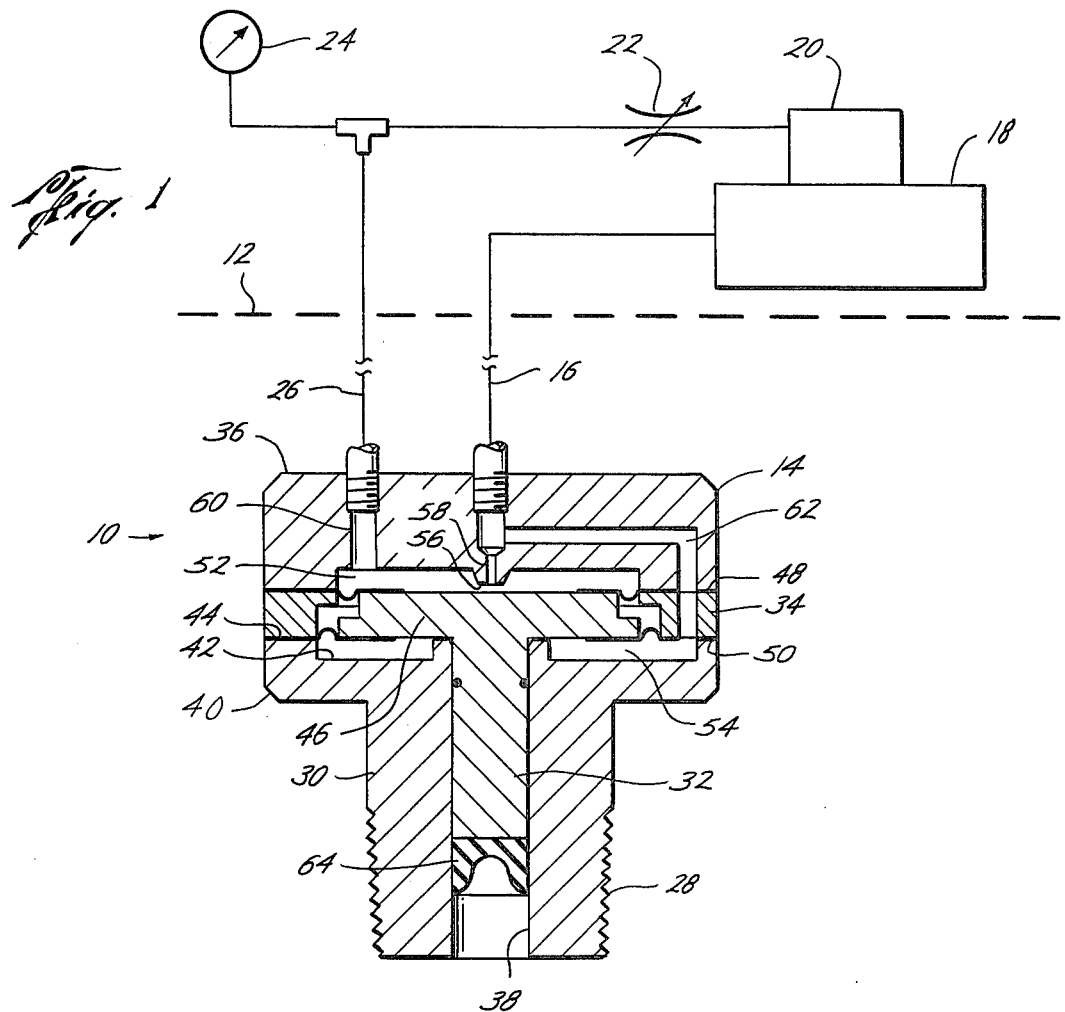
FIG. 1 is a schematic drawing of the improved apparatus of the present invention.

The remote indicator apparatus 10 shown in FIG. 1 is to be used to provide an indication of the well head pressure in a submarine well at the surface 12 of the water. The improved apparatus includes the transmitter 14 which is positioned at the submarine well head location, a return line 16 connecting the transmitter 14 to the reservoir 18 at the surface, the pump 20, the variable restrictor 22, the gauge 24 and the main pressure line 26 which connects from the pump 20 and restrictor 22 to the transmitter 14. A suitable means is provided to connect the transmitter 14 to the well head (not shown) such as the threads 28 on transmitter 14 which allow it to be directly attached to the well head so that well head pressure is delivered to transmitter 14.

Transmitter 14 includes the body 30 on which threads 28 have been formed, the piston 32, the annular spacer 34 and the cap 36. Body 30 has a central bore 38 extending therethrough and flange 40 at the end opposite threads 28. Annular recess 42 is formed in outer face 44 of flange 40. Flange 46 on piston 32 is positioned within annular spacer 34 and cap 36 is suitably secured by cap screws (not shown) to hold the annular diaphragms 48 and 50 between cap 36 and spacer 34 and between spacer 34 and flange face 44 of body 30, respectively. Diaphragms 48 and 50 also have their inner peripheries secured to opposite sides of piston flange 46. Chambers 52 and 54 are formed on opposite sides of piston flange 46. Further, the effective area of piston flange 46 and diaphragm 48 exposed to the pressure in chamber 52 is equal to the effective area of piston flange 46 and diaphragm 50 exposed to the pressure in chamber 54.

Valve seat 56 is formed on cap 36 facing piston flange 46 so that when piston flange 46 engages seat 56 return flow through passage 58 and line 16 is shut off. Line 26 connects into passage 60 in cap 36 so that liquid communication between gauge 24 and chamber 52 is always open. Passage 58 communicates from chamber 52 to return line 16 and to passage 62 which provides communication between chamber 54 and return line 16.

The seal cup 64 is positioned within bore 38 to transmit the well head pressures to piston 32. Thus, with pump 20 pumping liquid at a controlled rate, which is preferred to be relatively slow to minimize friction losses, such liquid is pumped into chamber 52 and returns through valve seat 56, passage 58 and return line 16 to reservoir 18. In this condition both sides of piston flange 46 are exposed to the same pressure, i.e., the hydrostatic head in lines 26 and 16. When pressure in the well head increases, piston 32 moves to close valve seat 56. Piston 32 moves with any pressure on seal cup 64 sufficient to overcome friction since the forces on piston flange 46 and diaphragms 48 and 50 are equal. Thus, any force on piston 32 causes it to move. As soon as valve seat 56 is closed, the pressure within chamber 52 builds responsive to the pumping of liquid by pump 20 which increased pressure is indicated on gauge 24. When the additional pressure in chamber 52 creates a force which exceeds the force on piston 32 by well head pressure, piston flange 46 disengages from valve seat 56 to exhaust pressure from chamber 52 and lower the pressure therein.

By having the same effective areas exposed to the pressures of chambers 52 and 54, the piston and diaphragms are always balanced with respect to hydrostatic head since the upper ends of lines 16 and 26 are at substantially the same level at the surface. Thus, well head pressure may be indicated in gauge 24 through proper calibration.

The effective pressure area of piston flange 46 and the area of central bore 38 may be established to have any desired relationship so that the transmitted line pressure may be stepped down or up, or they may have a one to one ratio.

The apparatus of the present invention may be used to provide a surface indication of the position of subsea well head equipment, such as a valve or a choke, for example. This may be accomplished by attaching a spring to the tail rod of a valve or choke and inserting the spring and tail rod into bore 38 to exert a force on piston 32. The pressure transmitted and indicated by the gauge 24 gives an indication of the position of the valve or choke. Other subsea movements can be sensed and provided with a surface indication in this same manner.

Figure 2:
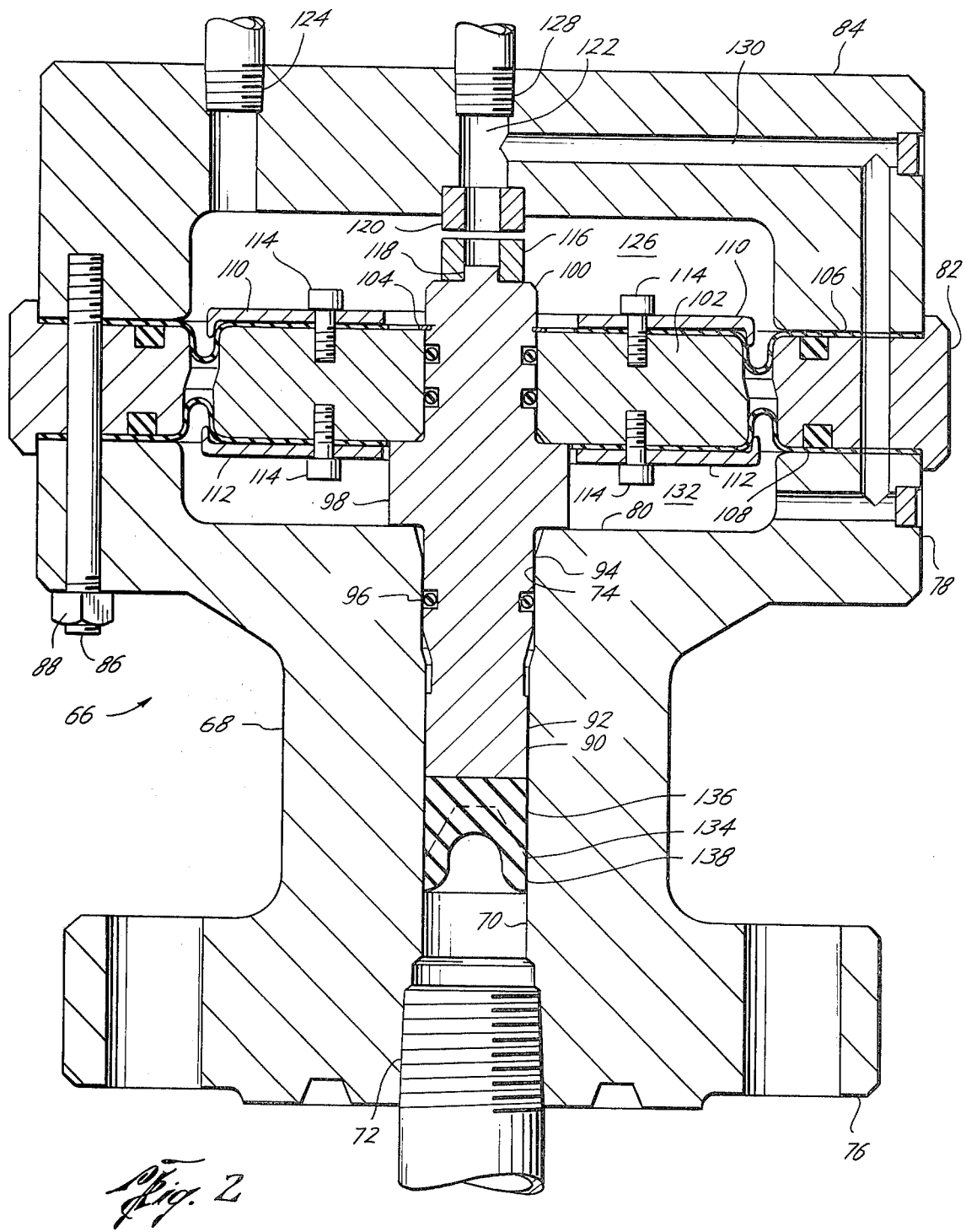
FIG. 2 is a sectional view of the preferred form of transmitter of the present invention.

The preferred form of transmitter 66 is shown in detail in FIG. 2. The transmitter body 68 has central bore 70 with internal threads 72 at one end and enlarged counterbore 74 at the other end. Flange 76 provides a means for connecting to subsea well head equipment (not shown). Flange 78 surrounds recess 80 and is connected to spacer 82 and cap 84 by studs 86 and nuts 88.

The piston 90 includes a first cylindrical portion 92 which is slidably positioned within central bore 70, intermediate portion 94 which is sealed with respect to the counterbore 74 by O-ring 96, flange 98 and a second cylindrical portion 100 on which ring 102 is secured between flange 98 and snap ring 104. Diaphragms 106 and 108 are held around their outer edges by cap 84, spacer 82 and flange 78. The inner edges of diaphragms 106 and 108 are secured to ring 102 by annular clamps 110 and 112 and cap screws 114. Seat engaging ring 116 is secured to the end of piston 90 around the projection 118 and is adapted to engage seat 120 which is secured to the inner side of cap 84 surrounding exhaust passage 122. It is preferred that ring 116 and seat 120 be of relatively hard wear resistant material such as tungsten carbide. Port 124 extends through cap 84 into chamber 126. Port 128 extends through cap 84 into communication with exhaust passage 122 and passage 130 which extends through cap 84, spacer 82 and flange 78 into chamber 132 between recess 80 and diaphragm 108. Cup seal 134 is positioned within central bore 70 against the end of piston 90 and is preferably composed of two cups 136 and 138 with cup 136 which is against the end of piston 90 being a 90 Durometer elastomer and cup 138 being a 65 Durometer elastomer.

As shown in FIG. 2, the effective outer diameter of diaphragm 108 is larger than the effective outer diameter of diaphragm 106 to balance the hydrostatic heads.

Figure 3:
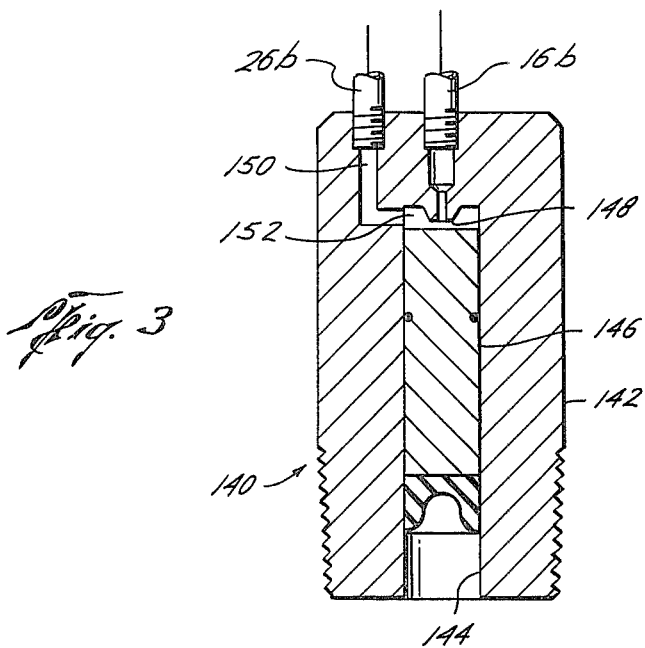
FIG. 3 is a sectional view of a modified form of transmitter.

A modified form of transmitter 140 is shown in FIG. 3. Transmitter 140 includes body 142 having a central bore 144 and piston 146 reciprocally mounted in central bore 144. Bore 144 ends in valve seat 148 which is in communication with return line 16b and pressure line 26b is connected into port 150 which is in communication with chamber 152. In this form of transmitter there is no balancing of the hydrostatic head but in shallow waters or when the pressure being measured is substantially larger than the pressure of the static head, such device may be satisfactory. Adjustment may be made in the indicated reading at the surface but until the static head has been overcome by the subsea well head pressure, there is not a surface indication of pressure.

What is claimed is:

1. Apparatus for indicating, at an upper level, a remote subsea condition which condition can exert a force indicative thereof, comprising a reservoir of hydraulic fluid at the upper level,
means for pumping fluid from the reservoir to a supply line,
pressure indicating means in the supply line at the upper level,
a hydraulic transmitter at the remote subsea level,
said supply line being connected to the transmitter,
a return line connecting the transmitter to the reservoir,
the hydraulic heads of the supply line and the return line being approximately equal,
said transmitter having a pressure responsive member one side of which is exposed to a force indicative of said condition and the other side to pressure in the supply line and having an exhaust valve in communication with the return line, said valve closing when said force is greater than that due to pressure in the supply line.

2. An apparatus according to claim 1 wherein said transmitter includes
a body having a central bore,
a piston positioned within said bore,
a valve seat adapted to be engaged by said piston when it is exposed to increases in forces acting thereon,
said piston being exposed to the pressure of said pumped hydraulic fluid on the side engaging said valve seat,
said valve seat surrounding return line communication to said reservoir.

3. An apparatus according to claim 2 wherein said piston includes
a flange,
means for securing the inner periphery of a first diaphragm to one side of said flange,
means for securing the outer periphery of said first diaphragm to said body,
means for securing the inner periphery of a second diaphragm to the opposite side of said flange, and
means for securing the outer periphery of said second diaphragm to said body,
said diaphragms forming equal opposing effective pressure areas on said diaphragms and said piston.

4. An apparatus according to claim 1 wherein said transmitter includes
a body having a central bore terminating in a pressure chamber,
a first port in said body connecting from said supply line to said pressure chamber,
a second port in said body connecting from said pressure chamber to said return line,
said pressure responsive member engaging said exhaust valve when the condition force is greater than the force on said pressure responsive member from the pumped hydraulic fluid.

5. An apparatus according to claim 1, including
means for balancing the hydraulic heads of the supply and return lines on said pressure responsive member.

6. An apparatus according to claim 1, including
a variable restrictor controlling flow from said pump to said pressure indicating means and to said hydraulic transmitter.

7. An apparatus for indicating at an upper level a remote subsea condition which condition can exert a force indicative thereof, comprising
a pump,
a reservoir of hydraulic fluid,
means connecting the pump to the reservoir to draw hydraulic fluid therefrom,
a variable flow controller,
a pump line connecting the discharge of said pump through said flow controller,
a pressure gauge connected to indicate pressure in said line downstream of said flow controller,
a return line connected to said reservoir,
a hydraulic transmitter at the remote loctation,
said transmitter being connected to said pump line and said return line, said transmitter including
a body having a central bore,
a piston slidably positioned within said bore, one side of which is exposed to a force responsive to the condition to be indicated and the other side to hydraulic fluid from said pump line,
an exhaust valve surrounding communication between the pump line and the return line and seat adapted to be engaged by said piston when it is exposed to increases in forces acting thereon,
said valve closing when the condition force is greater than the force from the pumped hydraulic fluid,
said piston being exposed to the pressure of said pumped hydraulic fluid on the side engaging said valve seat,
said valve seat surrounding return line communication to said reservoir, and
a diaphragm secured to said piston and defining opposed areas one side of which is exposed to pumped hydraulic fluid pressure when said exhaust valve seat is closed by said piston and the other side of which is exposed to return line communication.

8. An apparatus according to claim 6 wherein the opposed sides of said diaphragm have equal effective pressure areas.

9. A hydraulic pressure transmitter comprising
a body having a central bore,
a piston slidably positioned within said central bore,
a valve seat surrounding an exhaust port and adapted to be engaged by said piston,
a port through said body for communicating pumped hydraulic pressure to the side of said piston urging said piston away from said valve seat,
means for exerting a force on said piston responsive to a condition to be indicated, whereby said force urges said piston toward said valve seat,
said pumped hydraulic pressure being proportional to said force since said piston closes said valve seat until said force is overcome and then said piston disengages from said valve seat,
a diaphragm secured to said piston,
means exposing one side of said diaphragm to pumped hydraulic pressure, and
means exposing the opposite side of said diaphragm to the exhaust port pressure.

10. A hydraulic pressure transmitter according to claim 9 wherein
the effective pressure areas of opposite sides of said diaphragm are equal.

11. A hydraulic pressure transmitter comprising
a body having a central bore,
a piston slidably positioned within said central bore,
a valve seat surrounding an exhaust port and adapted to be engaged by said piston,
a port through said body for communicating pumped hydraulic pressure to the side of said piston urging said piston away from said valve seat,
means for exerting a force on said piston responsive to a condition to be indicated, whereby said force urges said piston toward said valve seat,
said pumped hydraulic pressure being proportional to said force since said piston closes said valve seat until said force is overcome and then said piston disengages from said valve seat,
said piston having a flange,
a first diaphragm secured to said piston flange and being exposed to the pressure of said exhaust port,
a second diaphragm secured to said piston flange and being exposed to the pumped pressure, and
said diaphragms and said piston flange having equal and opposite effective pressure areas.

* * * * *